No. 700,495.  
R. HOPFELT.  
ELECTRODE FOR ARC LAMPS.  
(Application filed Feb. 24, 1902.)  
(No Model.)

Patented May 20, 1902.

WITNESSES:  
F. W. Wright.  
Charles C. Abbe.

INVENTOR  
ROBERT HOPFELT.  
BY  
Howson and Howson  
HIS ATTORNEYS

UNITED STATES PATENT OFFICE.

ROBERT HOPFELT, OF BERLIN, GERMANY.

ELECTRODE FOR ARC-LAMPS.

SPECIFICATION forming part of Letters Patent No. 700,495, dated May 20, 1902.

Application filed February 24, 1902. Serial No. 95,415. (No model.)

*To all whom it may concern:*

Be it known that I, ROBERT HOPFELT, a subject of the Emperor of Germany, residing in Berlin, Germany, have invented an Improved Electrode for Arc-Lamps, of which the following is a specification.

Arc-light electrodes which are made of carbids decomposable in water, such as metallic carbids—calcium carbid, for example—give a much more powerful arc than do ordinary carbon electrodes. Such electrodes cannot be employed in ordinary arc-lamps, however, because of the decomposition of the carbid by the moisture in the air.

The object of my invention is to so construct carbid electrodes for arc-lamps that they will not be affected by the moisture in the atmosphere, and accordingly the electrodes will be as durable as or more durable than carbon electrodes in use. This object I attain by covering the surface of the carbid electrodes with a layer impervious to moisture.

Figure 1:
Figure 2:

In the accompanying drawings, Figure 1 is a longitudinal section, and Fig. 2 is a transverse section, of an electrode embodying my invention.

In the figures, A indicates the body, and B the layer or envelop protecting the carbid from moisture. Such layer or envelop may consist of certain metals or of a thin layer of varnish or cement or of vitreous coatings, &c. Such a covering may be advantageously produced by applying metal in the form of powder, metal salts, or metalloid salts with an organic cement or like binding substance to the electrodes and then burning them in a furnace. By this burning process the binding substance is first of all driven off and then the metals or metal salts melt and cover the electrodes at their surface with a close-fitting impervious layer. The envelops which are employed with ordinary electrodes have quite a different purpose, as these latter are intended merely to increase the conductibility or to color the light, so that the quality of keeping off the moisture need not necessarily be present, while the envelops here described are for the purpose of protecting the carbid electrodes against the decomposing action of the moisture in the air. Protracted experiments have shown that this can also be effected by surrounding the electrodes with a protecting metal envelop, which is advantageously drawn by mechanical means over the electrodes after the completed production of the electrodes—that is, after the same have been burned in the kiln. The metals which are employed with ordinary carbon electrodes—as, for instance, copper—cannot be used for such carbid electrodes, as, in the first place, their melting-point is much too high, and, in the second place, such metals, particularly copper with carbid, at the slightest entrance of moisture effect an explosion of the acetylene developed, so that the electrodes burst apart. It is advantageous to employ only such metals as have a melting-point under 1,050° centigrade. The temperature which forms in the crater of the carbid electrodes is apparently so low that if, for example, iron or even copper or nickel were employed as a covering for carbid electrodes these absolutely would not melt, whereas these metals immediately evaporate when they are laid around carbon electrodes. Apparently a much higher temperature is generated in this arc-flame than in the crater.

It has been shown that tin, zinc, magnesium, brass, or, above all, aluminium can be advantageously employed for my moisture-protecting coating.

The destructive influence of the air on the carbid electrodes can also be guarded against by covering these electrodes with a thin layer of a varnish or a solid cement. The solvent, as well as the organic constituents of the varnish, must be so constituted that the same do not produce a sooty flame in the light-arc, as the reflector which is necessary for uniform radiation of light would then become blackened and the intensity of the light considerably diminished. Therefore thick alcoholoids—for example, glycerin—may be advantageously employed, the carbid electrodes being dipped in glycerin or covered with a cement which is mixed with glycerin. In the first case the carbid is dissolved at the surface by the glycerin and converted into gas and lime. The mass of lime in consequence of the separation of the solvent then surrounds the carbid in such an impervious layer that the moisture of the air is absolutely innocuous. The glycerin evaporates or burns completely in the flame-arc with a bright flame without depositing even the slightest layer of soot.

If it is desired to cover the pieces of carbid with a cement, any metal oxids may be dissolved beforehand in glycerin, some carbon being advantageously mixed, so that the coating itself will become conductive of current. Such a coating hardens after a short time and also protects the carbid against moisture without producing any injurious influences in the light while burning. Instead of glycerin other alcohols or alcoholoids can be employed.

If varnishes or covering means of an organic nature—as, for instance, tar—be employed, it is advantageous to proceed in such manner that the electrodes (after saturation and advantageously after drying when using tar, for instance) are burned in order to change this organic substance into such solid carbon that the latter forms a sufficient means of keeping out air and moisture. If such a saturation, with subsequent burning, is repeated sufficiently often, the electrode can safely be covered with so close a layer of carbon that it may be brought into direct contact with even aqueous liquid.

I claim as my invention—

1. As a new article of manufacture an arc-lamp electrode of carbid, having a covering-envelop impervious to water to protect the electrode against the decomposing action of the moisture of the air.

2. As a new article of manufacture, an arc-lamp electrode of carbid having a solid metal envelop protecting the carbid from moisture, substantially as described.

3. As a new article of manufacture an arc-lamp carbid electrode having a protective envelop of aluminium.

In testimony whereof I have signed my name to this specification in the presence of two subscribing witnesses.

ROBERT HOPFELT.

Witnesses:
 AUGUST SIEGFRIED DOCEN,
 PAUL STAAL.